United States Patent [19]
Bäckström

[11] Patent Number: 6,147,983
[45] Date of Patent: Nov. 14, 2000

[54] TELECOMMUNICATIONS SYSTEMS

[75] Inventor: Tomas Bäckström, Cary, N.C.

[73] Assignee: Telefonaktiebolaget LM Ericsson, Stockholm, Sweden

[21] Appl. No.: 08/995,543

[22] Filed: Dec. 22, 1997

[30] Foreign Application Priority Data

Dec. 23, 1996 [GB] United Kingdom .................. 9626747

[51] Int. Cl.⁷ ............................. H04B 7/212; H04Q 7/00
[52] U.S. Cl. ........................... 370/330; 370/331; 370/321
[58] Field of Search ................................ 370/321, 322, 370/326, 329, 330, 331, 332, 341, 337; 455/439

[56] References Cited

U.S. PATENT DOCUMENTS

| | | |
|---|---|---|
| 4,608,711 | 8/1986 | Goldman . |
| 5,570,352 | 10/1996 | Poyhonen ................................ 370/330 |
| 5,787,346 | 7/1998 | Iseyama ................................. 455/439 |
| 5,946,306 | 8/1999 | Talarmo ................................ 370/337 |

*Primary Examiner*—Chi H. Pham
*Assistant Examiner*—Brenda H. Pham
*Attorney, Agent, or Firm*—Burns, Doane, Swecker & Mathis, L.L.P.

[57] ABSTRACT

A base station comprises a plurality of transceivers, one of which normally performs verifications, but is able to handle traffic channels at time of high demand. When it is desired to block one transceiver, for example for maintenance purposes, calls allocated to that transceiver can be handed off to other transceivers before the device is fully blocked.

16 Claims, 1 Drawing Sheet

TELECOMMUNICATIONS SYSTEMS

TECHNICAL FIELD OF THE INVENTION

This invention relates to a base station, and to a base station transceiver, and in particular to a method of operation thereof, for use in a mobile communications system. In particular, the invention relates to the efficient utilisation of the base station resources.

DESCRIPTION OF RELATED ART

In current cellular telephone systems, using the IS-54 specification, each base station typically includes several transceiver devices. Decisions regarding hand-offs are based on measurements performed by the mobile, and verifications performed by the base stations.

Each active mobile is continuously measuring signal strength on frequencies transmitted from neighbouring base stations. The values are reported to the system, which keeps a list of potential target cells for hand-off, in the event that the quality of the current connection falls below an acceptable level. When this happens, the system may decide that, in order to improve the connection quality, a hand-off should be performed. The system then chooses a target cell from the list, and orders the chosen target cell to verify that the mobile is detectible with acceptable quality, in order to ensure that the connection quality will be acceptable after hand-off. This procedure may be repeated with other target cells, until an acceptable target cell is found.

The verifications are performed by a dedicated transceiver device located in each base station. The dedicated verification device is often referred to as a VER-device, while the transceiver devices which carry the control channels and traffic channels are often referred to as DVC-devices. A small base station may have three DVC-devices and one VER-device, which means that 25% of the hardware cost of the base station is the cost of the VER-device, since the VER-device and the DVC-devices are of comparable complexity.

In order to perform a verification, the VER-device tunes its receiver to the frequency used by the mobile, and first searches for the synchronisation sequence, which differentiates the specific mobile with which it is concerned from other mobiles using the other time slots on the same frequency. The VER-device then searches for the digital voice channel colour code, or DVCC, to verify that it is receiving a signal from the intended mobile. A determination can then be made as to the quality of the connection. The verification procedure can then be repeated, in order to be able to compensate for effects such as fading and shadowing.

SUMMARY OF THE INVENTION

One problem associated with the known base stations is that, particularly in the case of small (pico) base stations, the VER-device accounts for a large part of the hardware cost.

An object of the present invention is to allow at least one device in a base station to be used for performing verifications as well as for carrying traffic channels, thereby reducing or eliminating the cost of hardware which is dedicated to the performance of verifications.

A further problem which arises with known base stations is that, from time to time, it is necessary to clear traffic from one of the transceiver devices, for example to allow new software to be loaded, or to perform maintenance. This can only be done by blocking all current calls on that device.

An object of the present invention is to allow a transceiver device to be blocked, without requiring any current calls to be terminated.

In particular, a first aspect of the invention relates to a base station, and a method of operation thereof, in which a transceiver device which performs verifications is also able to handle traffic calls.

In accordance with a second aspect of the invention, a transceiver device which is to be blocked is able to hand-off calls to other transceiver devices within the base station.

Advantageously, when a transceiver device which performs verifications is also able to handle traffic calls, and that device is carrying traffic calls but other transceiver devices within the base station have free time slots, that transceiver device is able to hand-off calls to the other transceiver devices.

DETAILED DESCRIPTION OF PREFERRED EMBODIMENTS

Figure 1:
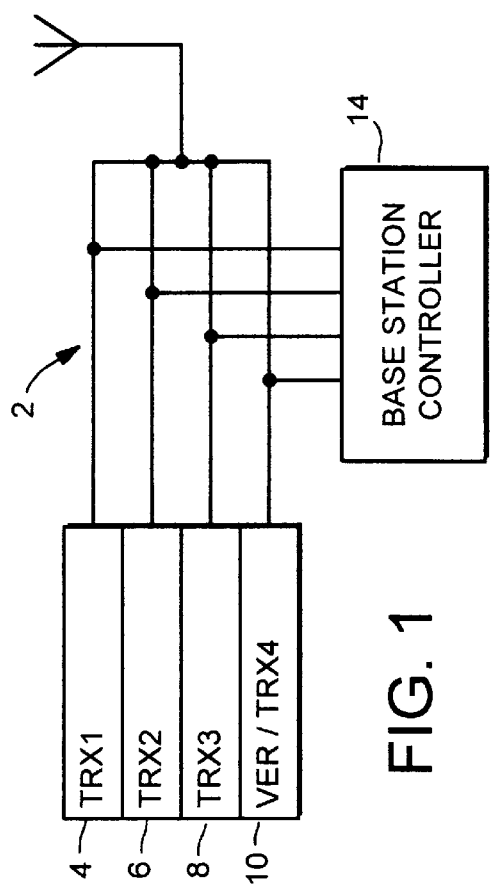
FIG. 1 is a schematic representation of a base station in accordance with the invention.

FIG. 1 shows a base station 2 in accordance with the invention. The advantages of the present invention are particularly noticeable when applied to small base stations, and the base station 2 is a pico base station for use in an indoor cellular system, but it will be appreciated that the invention is applicable to any base station. The base station includes four transceivers 4, 6, 8, 10. Transceivers 4, 6, 8 are used for traffic channels, and for the digital control channel. In one embodiment, each transceiver device operates on a respective different frequency, in three time slots, with each time slot being allocated either to a traffic channel or to the digital control channel. These transceivers 4, 6, 8 are also referred to as transceivers TRX1, TRX2 and TRX3 respectively.

The fourth transceiver 10 also has a respective operating frequency allocated to it, and is also divided into three time slots. This device is also used for performing verifications when necessary, and is also referred to herein as VER/TRX 4.

The transceivers are connected to an antenna arrangement 12, and controlled by a base station controller 14.

In a prior art system, in which the fourth device is reserved for performing verifications, such a base station would be able to handle a maximum of 8 traffic channels (three time slots on each of TRX1, TRX2 and TRX3, with one time slot being reserved for the digital control channel), while in accordance with the present invention the base station can handle up to 11 traffic channels, without requiring additional hardware, since three traffic channels can also be allocated to VER/TRX4.

The digital control channel (DCC) is allocated to one of the transceivers 4, 6, 8, for example to time slot 1 of TRX1.

In accordance with preferred embodiments of the invention, when there are 8 or fewer mobiles connected to the base station, they are allocated to transceivers TRX1, TRX2 and TRX3. For example, Table 1 below shows a situation in which mobiles DVC1 and DVC2 are allocated to time slots 2 and 3 respectively of TRX1; mobiles DVC3, DVC4 and DVC5 are allocated to time slots 1, 2 and 3 respectively of TRX2; and mobile DVC6 is allocated to time slot 1 of TRX3. Time slots 2 and 3 on TRX3 are unallocated, and the fourth transceiver VER/TRX4 is free to perform verifications, as in the prior art.

TABLE 1

|  | TRX1 | TRX2 | TRX3 | VER/TRX4 |
|---|---|---|---|---|
| timeslot 1 | DCC | DVC3 | DVC6 | — |
| timeslot 2 | DVC1 | DVC4 | — | — |
| timeslot 3 | DVC2 | DVC5 | — | — |

As more mobile stations become connected to the base station, they too are allocated to TRX1, TRX2 and TRX3. Thus, Table 2 below shows the situation when mobiles DVC7 and DVC8 have been connected to the base station, in time slots 2 and 3 respectively of TRX3. The fourth transceiver VER/TRX4 still carries no traffic channels, and is available to perform verifications as required.

TABLE 2

|  | TRX1 | TRX2 | TRX3 | VER/TRX4 |
|---|---|---|---|---|
| timeslot 1 | DCC | DVC3 | DVC6 | — |
| timeslot 2 | DVC1 | DVC4 | DVC7 | — |
| timeslot 3 | DVC2 | DVC5 | DVC8 | — |

When further mobiles are connected to the base station, they are allocated to the fourth transceiver device VER/TRX4, which then has to act in a very similar way to the other transceivers, for most of the time. For example, it has a frequency specifically allocated to it. Table 3 below shows the situation in which mobiles DVC9 and DVC10 have been connected to time slots 1 and 2 respectively of VER/TRX4, while time slot 3 remains free.

TABLE 3

|  | TRX1 | TRX2 | TRX3 | VER/TRX4 |
|---|---|---|---|---|
| timeslot 1 | DCC | DVC3 | DVC6 | DVC9 |
| timeslot 2 | DVC1 | DVC4 | DVC7 | DVC10 |
| timeslot 3 | DVC2 | DVC5 | DVC8 | — |

Figure 2:
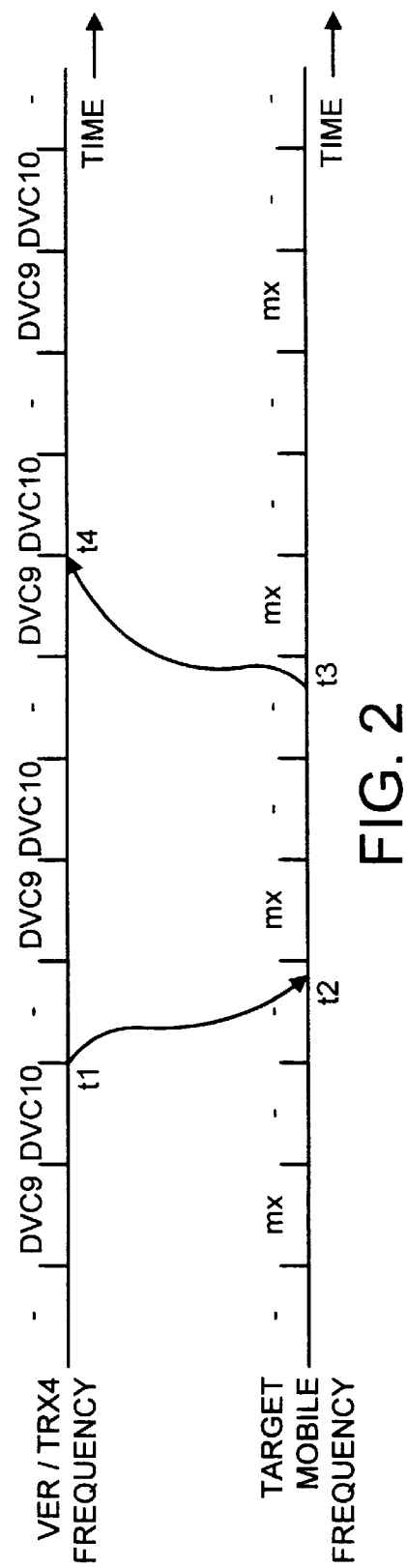
FIG. 2 is a time history of the operating frequency of a transceiver device operating in accordance with the first aspect of the invention.

When operating in this way, VER/TRX4 is also used for performing any necessary verifications, as illustrated with reference to FIG. 2. FIG. 2 shows the time histories of transmissions on two frequencies. The upper line represents transmissions on the operating frequency of the VER/TRX4 device. As mentioned above, the frequency has three time slots, a first of which is allocated to DVC9, a second of which is allocated to DVC10, and the third of which is free. The lower line in FIG. 2 represents transmissions on the frequency of a target mobile device, for which the base station is now required to perform a verification, to determine whether that mobile device should hand-off to the base station. The frequency of the mobile device also has three time slots, one of which is allocated to the mobile device mx. It will be appreciated that other mobile devices may be allocated to the other two time slots. In both the upper and lower lines, three time slots form a frame, lasting 20 ms.

As shown in FIG. 2, in normal operation, that is when not performing verifications, the device VER/TRX4 is operating on its own allocated frequency, handling traffic from mobiles DVC9 and DVC10. At time t1, a verification is ordered, to determine whether the further mobile device mx should be allocated to the base station. At this point, the device VER/TRX4 retunes its receiver to the frequency of the target mobile device, which it reaches at time t2. The transceiver VER/TRX4 then remains tuned to the frequency of the target mobile device for at least one frame period, i.e. 20 ms in the illustrated embodiment, to ensure that it receives a signal from the target mobile mx. During this period, the VER/TRX4 device searches for the mobile using the synchronisation sequence, and detects the DVCC. Signal strength measurements are then used by the base station controller 14 to make the required verification. If desired, the system can be set such that the VER/TRX4 device is tuned to the target mobile frequency for a longer period, for example to allow repetition of the verification, to improve the reliability thereof.

At time t3, i.e. after 20 ms, the VER/TRX4 device retunes to its own operating frequency, which it reaches at time t4.

Thus, the device which is handling traffic channels is also able to perform verifications. During the period from t1 until t4, the VER/TRX4 device is unable to handle traffic, which means that one or two time slots for DVC9 and DVC10 are lost. However, this is unlikely to be noticed by users.

Table 4 below shows the situation in which a further mobile station DVC11 has been allocated to time slot 3 of VER/TRX4.

TABLE 4

|  | TRX1 | TRX2 | TRX3 | VER/TRX4 |
|---|---|---|---|---|
| timeslot 1 | DCC | DVC3 | DVC6 | DVC9 |
| timeslot 2 | DVC1 | DVC4 | DVC7 | DVC10 |
| timeslot 3 | DVC2 | DVC5 | DVC8 | DVC11 |

In this situation, there is no need to impose any quality degradation on the mobile devices allocated to VER/TRX4 by performing verifications, because it is not possible to allocate any further mobiles to the base station, and so verification would serve no purpose.

It is envisaged that, in normal use, the device VER/TRX4 would only rarely be used for traffic channels, since the system capacity should be such that normal loads can be handled by the other transceivers TRX1, TRX2 and TRX3. Nevertheless, it is an advantage to be able to use a fourth transceiver to handle calls at peak times.

Table 5 below shows a situation after a period of peak traffic loading has just ended, and the situation is returning to normal.

TABLE 5

|  | TRX1 | TRX2 | TRX3 | VER/TRX4 |
|---|---|---|---|---|
| timeslot 1 | DCC | DVC3 | DVC6 | — |
| timeslot 2 | DVC1 | DVC11 | DVC9 | — |
| timeslot 3 | DVC10 | DVC5 | DVC8 | — |

As calls terminate, mobiles allocated to the VER/TRX4 device are handed off to time slots on the other devices, as those time slots become free. Thus, as shown in Table 5, mobiles DVC2, DVC4 and DVC7 have become disconnected, and mobiles DVC9, DVC10 and DVC11 have been handed off to time slot 2 on TRX3, time slot 3 on TRX1, and time slot 2 on TRX2 respectively. Thus, the VER/TRX4 device is now free to perform verifications again, and the mobiles DVC9, DVC10 and DVC11 no longer suffer the small quality degradations previously imposed by being allocated to the VER/TRX4 device.

Thus, this aspect of the invention allows more traffic to be handled by a base station. Alternatively, base stations may be designed to use less hardware than conventionally.

A further aspect of the invention relates to the general use of intra-cell hand-off, as described above with reference to Table 5.

It is often necessary for a system operator to clear a transceiver device from traffic, for example to allow new software to be loaded, or because of a fault on the device, or because the operating frequency of the device is required for other purposes. At present, when this situation arises, the device is blocked, and all existing calls to and from mobiles allocated to that device are terminated. Clearly, this causes inconvenience for users.

In accordance with the invention, however, intra-cell hand-offs can be used to avoid this disruption. Table 6 below shows a situation in which time slot 1 of TRX1 is being used for the digital control channel (DCC); mobiles DVC1 and DVC2 are allocated to time slots 2 and 3 of TRX1; mobiles DVC3 and DVC4 are allocated to time slots 1 and 2 of TRX2; and mobile DVC5 is allocated to time slot 1 of TRX3. The other time slots are free, and the VER/TRX4 device is being used for verifications.

TABLE 6

|           | TRX1 | TRX2 | TRX3 | VER/TRX4 |
|-----------|------|------|------|----------|
| timeslot 1 | DCC  | DVC3 | DVC5 | —        |
| timeslot 2 | DVC1 | DVC4 | —    | —        |
| timeslot 3 | DVC2 | —    | —    | —        |

If, now, it is desired to clear traffic from TRX2, for example, to load new software, the base station controller 14 initiates a soft blocking procedure. Specifically, mobiles DVC3 and DVC4 are handed off to TRX3, specifically to time slots 2 and 3 thereof as shown in Table 7.

TABLE 7

|           | TRX1 | TRX2 | TRX3 | VER/TRX4 |
|-----------|------|------|------|----------|
| timeslot 1 | DCC  | —    | DVC5 | —        |
| timeslot 2 | DVC1 | —    | DVC3 | —        |
| timeslot 3 | DVC2 | —    | DVC4 | —        |

When these intra-cell hand-offs have been completed, and TRX2 is clear of traffic, the necessary work can be done, without causing disruption to any calls.

If the soft blocking procedure becomes necessary at a time of relatively high demand, it may not be immediately possible to hand-off the calls from the device which is to be blocked. In that event, the intra-cell hand-off can be carried out only when time slots become available, and the clearance of traffic from the cell can be slightly delayed. This can be advantageous to users of the system, without causing excessive inconvenience for the system operator.

Thus, this aspect of the invention allows a transceiver device to be blocked, without requiring any existing calls to be terminated prematurely.

What is claimed is:

1. A base station, comprising a first number N of transceivers, each having a transmission frequency allocated thereto, and having a second number P of time slots, and one of the transceivers being designated as a verification device, wherein one of the time slots on a transceiver other than the verification device is designated as a control channel, and all $\{P^*(N-1)-1\}$ other time slots on the transceiver or transceivers other than the verification device are designated as traffic channels, and wherein the P time slots on the verification device are available for use as traffic channels.

2. A base station as claimed in claim 1, wherein, when traffic calls have been allocated to time slots on the verification device, said traffic calls are handed off to other transceivers within the base station as traffic calls allocated to time slots on the other transceivers are terminated.

3. A base station as claimed in claim 1, wherein, when traffic calls have been allocated to time slots on the verification device, said traffic calls are interrupted to allow the verification device to perform any necessary verifications.

4. A base station as claimed in claim 1, wherein the time slots on the verification device are allocated to traffic channels when the number of required traffic channels exceeds $[P^*(N-1)-1]$.

5. A base station as claimed in claim 1, wherein traffic calls are allocated to time slots on the transceiver or transceivers other than the verification device, leaving the verification device free to perform verifications, until such time as the time slots on the other transceiver or transceivers are fully occupied, and wherein further traffic calls are allocated to time slots on the verification device.

6. A method of operation of a base station comprising a first number N of transceivers, each having a transmission frequency allocated thereto, and having a second number P of time slots, the method comprising the steps of:

designating one of the transceivers as a verification device, designating one of the time slots on a transceiver other than the verification device as a control channel, and designating all $\{P^*(N-1)-1\}$ other time slots on the transceiver or transceivers other than the verification device as traffic channels, while making the P time slots on the verification device available for use as traffic channels.

7. A method as claimed in claim 6, wherein, when traffic calls have been allocated to time slots on the verification device, said traffic calls are handed off to other transceivers within the base station as traffic calls allocated to time slots on the other transceivers are terminated.

8. A method as claimed in claim 6, wherein, when traffic calls have been allocated to time slots on the verification device, said traffic calls are interrupted to allow the verification device to perform any necessary verifications.

9. A method as claimed in claim 6, further comprising allocating the time slots on the verification device to traffic channels when the number of required traffic channels exceeds $[P^*(N-1)-1]$.

10. A method as claimed in claim 6, comprising:

allocating traffic calls to time slots on transceivers other than a verification device, thereby leaving the verification device free to perform verifications, until such time as the time slots on the other transceivers are fully occupied; and allocating further traffic calls to time slots on the verification device.

11. A method of performing a verification using a verification transceiver in a base station comprising a first number N of transceivers, each having a transmission frequency allocated thereto, and having a second number P of time slots, the method comprising:

designating one of the N transceivers as said verification transceiver;

designating one of the P time slots on a transceiver other than the verification transceiver as a control channel;

designating all $\{P^*(N-1)-1\}$ other time slots on the transceivers other than the verification transceiver as traffic channels, while making the P time slots on the verification transceiver available for use as traffic channels, wherein a group of time slots from a frame period, performing a verification by returning the verification transceiver from the transmission frequency thereof to an operating frequency of a mobile for at least one frame period to perform the verification, and returning the verification transceiver to its transmission frequency when the verification has been performed.

12. A base station, comprising a first number N of transceivers, each having a transmission frequency allocated thereto, and having a second number P of time slots, and one of the N transceivers being designated as a verification device, wherein one of the P time slots on a transceiver other than the verification device is designated as a control channel, and all $\{P*(N-1)-1\}$ other time slots on the transceivers other than the verification device are designated as traffic channels, and wherein the P time slots on the verification device are available for use as traffic channels, the verification device being controllable to retune to an operating frequency of a mobile for at least one frame period, to perform a verification on said mobile.

13. A base station, comprising a plurality of transceivers, and being programmed, on receipt of a blocking signal to one of the transceivers, to hand off any calls presently using said one of the plurality of transceivers to another transceiver, or to respective other transceivers, and blocking said one of the plurality of transceivers only when all calls presently using said one of the plurality of transceivers have been handed off or terminated.

14. A base station as claimed in claim 13, wherein each transceiver has a respective operating frequency.

15. A base station as claimed in claim 13, wherein each transceiver has a plurality of time slots, and a handoff from said one of the plurality of transceivers to another transceiver is performed only when there is a free time slot on the other transceiver.

16. A method of blocking a transceiver of a base station having a plurality of transceivers, the method comprising sending a blocking signal to the transceiver, handing off all calls presently using the transceiver to the other transceiver, or to respective other transceivers, and blocking the transceiver only when all calls presently using the transceiver have been handed off or terminated.

* * * * *